United States Patent Office 3,222,378
Patented Dec. 7, 1965

3,222,378
PHTHALIMIDOMETHYL PHOSPHORUS COMPOUNDS
Ivan C. Popoff, Ambler, Burton Peter Block, Wayne, and Ludwig K. Huber, Philadelphia, Pa., assignors to Pennsalt Chemicals Corporation, Philadelphia, Pa., a corporation of Pennsylvania
No Drawing. Filed June 24, 1963, Ser. No. 290,245
12 Claims. (Cl. 260—326)

This invention relates to novel phthalimidomethyl phosphorus compounds having the structure

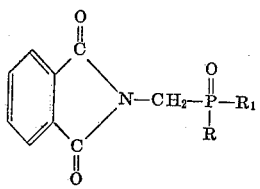

where $R_1$ is selected from the group consisting of alkyl and aryl containing up to 10 carbon atoms and $R_2$ is selected from the group consisting of hydroxy, phthalimidomethoxy, and alkyl, aryl, alkoxy and aryloxy containing up to 10 carbon atoms. These compounds are useful as plant response agents, chelating agents, and also as intermediates to the corresponding amino compounds obtained by hydrolysis as follows:

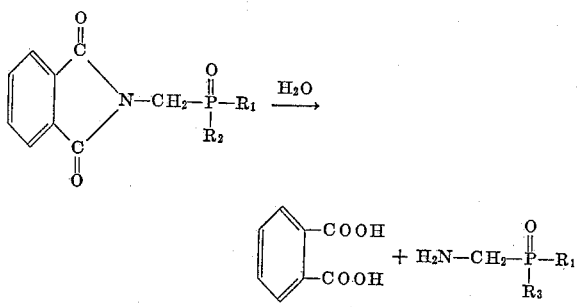

where $R_3$ is hydroxyl, alkyl, or aryl and $R_1$ and $R_2$ are as defined above. The amino compounds thus produced are also useful chelating agents and serve as important ligands for coordination polymers having an inorganic backbone.

When both $R_1$ and $R_2$ in the above formula of the phthalimidomethyl phosphorus compounds are alkyl or aryl, the compounds of the invention are phosphine oxides and such compounds are prepared by the reaction of an N-bromomethylphthalimide with the appropriate lower alkyl phosphinite whereby an alkyl bromide is eliminated. Thus, for example, the N-bromomethylphthalimide may be heated without a solvent or in an organic solvent system such as xylene, toluene, etc., with an alkyl phosphinite to obtain a reaction as follows:

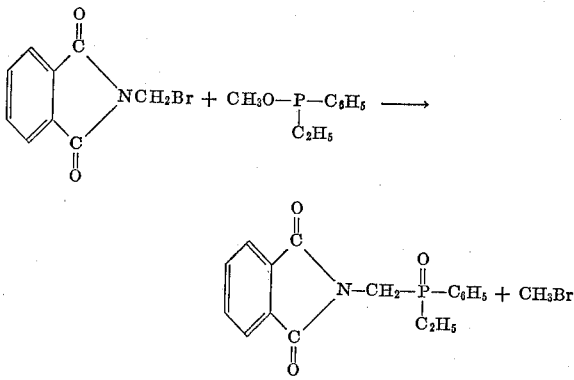

Appropriate phosphinites useful for making the phosphine oxides of the invention will include methyl diphenylphosphinite, butyl diphenylphosphinite, methyl dinaphthylphosphinite, methyl naphthyl-n-octylphosphinite, methyl naphthylphenylphosphinite, and the like.

Where $R_2$ in the above formula is alkoxy or aryloxy, the compounds of the invention are phosphinates and where $R_2$ is hydroxy, the compounds are phosphinic acids. To prepare the phosphinates, an N-bromomethyl phthalimide is reacted with the appropriate phosphonite of structure

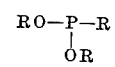

$$RO-P-R$$
$$\mathrm{O}R$$

Useful phosphonites, which may be prepared in accordance with the procedure of G. Kamai, Zhur. Obshchei Khim., vol. 18, p. 443 (1948), will include such compounds as dimethyl phenylphosphonite, diethyl phenylphosphonite, dibutyl phenylphosphonite, methyl phenyl phenylphosphonite, diethyl methylphosphonite, and the like. The phosphinic acid where $R_2$ is hydroxy is obtained by hydrolysis of the phosphinate with mineral acids such as HBr, HCl, etc.

As indicated, the preparation of the compounds of this invention by reaction of the N-bromomethylphthalimide and the appropriate phosphorus compound is carried out by heating the reactants and removing the alkyl bromide formed. The general procedure for this reaction involves contacting essentially stoichiometric amounts of the reagents, preferably (but not necessarily) under nitrogen with or without a solvent medium, at atmospheric or reduced pressures and at temperatures on the order of about 0 to 20° C. higher than the temperature at which the alkyl halide by-product begins to form. As the reaction proceeds the alkyl halide by-product is removed from the reaction zone, preferably by applying vacuum, and if desired this by-product may be condensed in a Dry Ice trap. The vacuum applied will vary considerably, depending upon the boiling point of the alkyl bromide formed, but will normally be in the order of 300 to 500 mm. When the alkyl halide is no longer generated, it is assumed that the reaction is complete and heating may be discontinued shortly thereafter. The product in the reaction flask is the desired product and may be purified by crystallization or distillation in accordance with normal procedures. The phosphine oxides and phosphinates of the invention are usually solid, crystalline materials with sharp melting points when pure. They are generally soluble in organic solvents such as acetone, ethanol, etc., but are insoluble in water.

When it is desired to prepare the phosphinic acids, the phosphinate is hydrolyzed with a mineral acid, preferably an excess of aqueous HBr, and the hydrolysis carried out at a temperature of about 50 to 100° C., preferably 70 to 80° C. The phosphinic acid is generally water-insoluble and precipitates from the hydrolysis mixture and may be filtered off and purified by washing to yield the desired product. The phosphinic acids of the invention are crystalline materials with melting points generally on the order of 200 to 300° C. They have only slight solubility in water, and show distinct acid character in that their saturated aqueous solutions show a pH on the order of 2.5 to 3.

The following examples will serve to more fully describe the invention.

*Example 1*

Diphenyl(phthalimidomethyl)phosphine oxide is obtained by reaction of equimolar amounts of N-bromomethylphthalimide and methyl diphenylphosphinite in xylene. The reaction mixture is refluxed at atmospheric pressure for 7 hours under a stream of nitrogen and 92% of the methyl bromide is collected in a Dry Ice trap, 38.6% of the crude product precipitates and is recrystalized from dioxane. The product is soluble in acetone and ethanol, insoluble in benzene, ether, n-hexane, water and xylene, and melts at 206–206.5° C. Found: 69.31% C, 4.18% H, 3.85% N, and 8.64% P. Calculated for $C_{21}H_{16}NO_3P$: 69.80% C, 4.43% H, 3.88% N and 8.60% P.

*Example 2*

Methyl phenyl(phthalimidomethyl)phosphinate is prepared by adding dimethyl phenylphosphonite to N-bromomethylphthalimide in toluene. The addition lasts 6 hours as the reaction mass is refluxed at atmospheric pressure at 105–112° C. The reaction product is then poured into n-hexane and the product (94.2% yield) filtered off. The product melts at 93.5–96° C. and its melting point does not change upon recrystallization from a 1:1 mixture of benzene and n-hexane. It is soluble in acetone, benzene and toluene, and insoluble in n-hexane and water. Found: 61.25% C, 3.94% H, 4.45% N, and 9.88% P. Calculated for $C_{16}H_{14}NO_4P$: 61.10% C, 4.48% H, 4.45% N, and 9.84% P.

*Example 3*

Ethyl phenyl(phthalimidomethyl)phosphinate is prepared by adding N-bromomethylphthalimide to diethyl phenylphosphonite in xylene. The addition lasts 6 hours while the reaction mixture is refluxed at reduced pressure of about 300 mm. The by-product, ethyl bromide, is collected in 92.5% yield. The reaction mixture is cooled at 5° C. and is filtered to isolate 98% phosphinate product melting at 105–109° C. The pure product, melting at 111–113° C., is obtained in 86% yield by recrystallization from a 1:1 mixture of benzene and n-hexane. It is soluble in acetone, benzene and ethanol, and is insoluble in n-hexane and water. Found: 62.00% C, 4.86% H, 4.25% N, and 9.43% P. Calculated for $C_{17}H_{16}NO_4P$: 61.99% C, 4.33% H, 4.48% N, and 9.54% P.

*Example 4*

Phthalimidomethyl phenyl(phthalimidomethyl)phosphinate is obtained by reaction of dimethyl phenylphosphonite with N-bromomethylphthalimide without solvent. An equimolar mixture of the reaction components is heated to 50° C. at atmospheric pressure. At this temperature, a highly exothermic reaction takes place and the temperature rises to at least 150° C. After additional heating at 120–130° C. for 4 hours, a 92.5% yield of methyl bromide is collected. The reaction mixture is dissolved in benzene and the same volume of ether is added. The crude product precipitates (M.P. 158–167° C.). It is recrystallized from a 10:1 mixture of benzene and n-hexane and then melts at 168–169° C. Found: 62.67% C, 4.00% H, 5.97% N, and 7.13% P. Calculated for $C_{24}H_{17}N_2O_6P$ of the structure

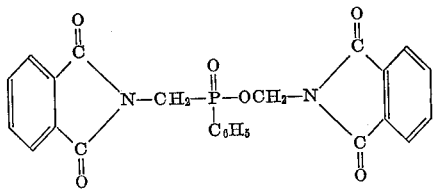

62.70% C, 3.74% H, 6.10% N, and 6.73% P.

The benzene-ether mother liquor is worked up to isolate methyl phenyl(phthalimidomethyl)phosphinate identical to that obtained in Example 2. The phthalimidomethyl phenyl(phthalimidomethyl)phosphinate is also prepared in practically theoretical yield by reacting two moles of N-bromomethylphthalimide with one mole of dimethyl phenylphosphonate at 150–160° C.

*Example 5*

Phenyl(phthalimidomethyl)phosphinic acid is prepared by hydrolyzing methyl phenyl(phthalimidomethyl)phosphinate with an excess of 48% aqueous HBr for 10–15 minutes at 70–80° C. The reaction mixture is a homogeneous solution at 25° C.; however, when the temperature reaches 70° C., a precipitate forms. The precipitate is filtered at 20° C. and thoroughly washed with water to obtain 81% yield of the phosphinic acid melting at 270–273° C. No change in melting point is observed after recrystallization from methanol. Found: 59.74% C, 3.97% H, 4.75% N, and 10.87% P. Calculated for $C_{15}H_{12}NO_4P$: 59.90% C, 4.03% H, 4.66% N, and 10.29% P. The product is only slightly soluble in water and its saturated aqueous solution has a pH of 2.7.

*Example 6*

Ethyl methyl(phthalimidomethyl)phosphinate is prepared by reaction of diethyl methylphosphonite with N-bromomethylphthalimide in xylene. The reaction mixture is kept for 4 hours at 70–80° C. at reduced pressure of about 300 mm. and 99% of the theoretical ethyl bromide is collected. Upon filtration at 10° C., 99% of the crude product (M.P. 99–105° C.) is recovered and recrystallized from 1:1 mixture of benzene and n-hexane to recover 92% of ethyl methyl(phthalimidomethyl)phosphinate melting at 109–111° C. The product is soluble in acetone, carbon tetrachloride, ethanol, ether and methanol, and it is insoluble in n-hexane. Its infrared spectrum confirms the presence of P→O, P—O—C and C(O)N< bonds. Found: 53.40% C, 4.78% H, 5.05% N, and 11.20% P. Calculated for $C_{12}H_{14}NO_4P$: 53.93% C, 5.28% H, 5.24% N, and 11.59% P.

*Example 7*

Methyl(phthalimidomethyl)phosphinic acid is prepared by the hydrolysis of ethyl methyl(phthalimidomethyl) phosphinate. Solid product precipitates in the hydrolysis mixture when the temperature reaches 65° C. After 20–30 minutes at 65–80° C. a sample of the solid is removed and recrystallized from ethanol to obtain the pure methyl(phthalimidomethyl)phosphinic acid melting at 231–233° C. Found: 49.90% C, 4.44% H, 6.44% N, and 12.40% P. Calculated for $C_{10}H_{10}NO_4P$: 50.22% C, 4.21% H, 5.86% N, and 12.95% P. Its infrared spectrum confirms the presence of P→O, P—OH and —C(O)N<. It is soluble in hot ethanol and hot water, and insoluble in acetone, benzene, ether and n-hexane. Its 0.01 molar aqueous solution has a pH of 2.2.

*Example 8*

Following the procedure of Example 1, dinaphthyl-(phthalimidomethyl)phosphine oxide is obtained by reacting equimolar amounts of N-bromomethylphthalimide and methyl dinaphthylphosphinite.

*Example 9*

Di(n-octyl) methylphosphonite and N-bromomethylphthalimide react in accord with the details of Example 3 but without solvent, to yield n-octyl methyl(phthalimidomethyl)phosphinate.

*Example 10*

Following the details of Example 3, methyl phenyl phenylphosphonite and N-bromomethylphthalimide react in xylene to yield phenyl methyl(phthalimidomethyl)phosphinate.

*Example 11*

Following the details of Example 1, N-bromomethylphthalimide and methyl dimethyl phosphinite in xylene give dimethyl(phthalimidomethyl)phosphine oxide.

*Example 12*

Following the details of Example 1, N-bromomethylphthalimide is reacted with methyl methyl(phenyl)phosphinite to yield methyl(phenyl)phthalimidomethylphosphine oxide.

Example 13

Aqueous dispersions are made by adding a stock formulation consisting of 90 parts by weight of xylene, 5 parts of a polyether glycol surfactant ("Triton" X-155) and 5 parts of methyl phenylphthalimidomethylphosphinate to water and the dispersions are sprayed on the foliage of plants. Spraying this aqueous dispersion on the leaves of bean plants at a rate of 10 lbs. of active ingredient per acre caused 10% desiccation after 7 days.

Example 14

A water dispersion of ethyl phenylphthalimidomethylphosphinate applied to bean plants at a rate of 10 pounds per acre caused trifoliate growth inhibition within 10 days.

It will be understood that numerous changes and variations may be made from the above discussion and examples without departing from the spirit and scope of the invention.

We claim:
1. A compound of the formula

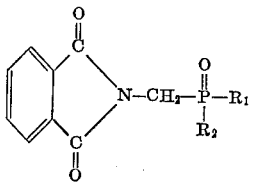

where $R_1$ is selected from the group consisting of alkyl of from 1 to 2 carbon atoms, phenyl, and naphthyl and $R_2$ is selected from the group consisting of hydroxyl, phthalimidomethoxy, alkyl of from 1 to 2 carbon atoms, alkoxy of from 1 to 2 carbon atoms, phenyl, and naphthyl.

2. Diphenyl(phthalimidomethyl)phosphine oxide.
3. Dinaphthyl(phthalimidomethyl)phosphine oxide.
4. Dimethyl(phthalimidomethyl)phosphine oxide.
5. Methyl phenyl(phthalimidomethyl)phosphine oxide.
6. Methyl phenyl(phthalimidomethyl)phosphinate.
7. Ethyl phenyl(phthalimidomethyl)phosphinate.
8. Phthalimidomethyl phenyl(phthalimidomethyl)phosphinate.
9. Ethyl methyl(phthalimidomethyl)phosphinate.
10. Phenyl methyl(phthalimidomethyl)phosphinate.
11. Phenyl(phthalimidomethyl)phosphinic acid.
12. Methyl(phthalimidomethyl)phosphinic acid.

References Cited by the Examiner

UNITED STATES PATENTS

| | | | |
|---|---|---|---|
| 2,724,718 | 11/1955 | Stiles et al. | 260—461 |
| 3,053,729 | 9/1962 | Sun | 167—22 |
| 3,143,569 | 8/1964 | Abramo et al. | 260—461 |

OTHER REFERENCES

Chavane: Bull. Soc. Chim., 1948, pp. 774–777.

NICHOLAS S. RIZZO, *Primary Examiner.*